(12) United States Patent
Lawande et al.

(10) Patent No.: US 6,882,993 B1
(45) Date of Patent: Apr. 19, 2005

(54) INCREMENTAL REFRESH OF MATERIALIZED VIEWS WITH JOINS AND AGGREGATES AFTER ARBITRARY DML OPERATIONS TO MULTIPLE TABLES

(75) Inventors: Shilpa Lawande, Nashua, NH (US); Abhinav Gupta, Palo Alto, CA (US); Benoit Dageville, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 453 days.

(21) Appl. No.: 10/059,616

(22) Filed: Jan. 28, 2002

(51) Int. Cl.[7] .............................................. G06F 17/30
(52) U.S. Cl. .......................................... 707/2; 707/102
(58) Field of Search .................. 707/1–10, 100–104.1, 707/200–205

(56) References Cited

U.S. PATENT DOCUMENTS

| | | | | |
|---|---|---|---|---|
| 5,963,959 A | * | 10/1999 | Sun et al. ................... | 707/200 |
| 6,496,819 B1 | * | 12/2002 | Bello et al. .................... | 707/3 |
| 6,546,402 B1 | * | 4/2003 | Beyer et al. ................ | 707/201 |
| 6,708,179 B1 | * | 3/2004 | Arora ......................... | 707/102 |
| 6,763,352 B1 | | 7/2004 | Cochrane et al. ............. | 707/4 |

OTHER PUBLICATIONS

Jonathan Goldstein et al., Optimizing queries using materialized views: a practical solution, 2001, ACM Press Specia Interest Group on Management of Data, pp. 331–342.*

Satyanarayana R. Valluri et al., View relevance driven materialized view selection in data warehousing environment, 2002, Austrialian Computer Society, Inc. Darlinghurst, Australia, pp. 187–196.*

Oracle Corporation, "Create Materialized View" copyright 1996–2001, Oracle 9i Reference Release 1(9.0.1) Part #A90125–01, pp. 1–22).*

* cited by examiner

Primary Examiner—Diane D. Mizrahi
(74) Attorney, Agent, or Firm—Hickman Palermo Truong & Becker LLP; John D. Henkhaus

(57) ABSTRACT

A method is provided for incrementally refreshing a materialized view after multiple operations on a row of a base table of the materialized view, by determining an equivalent operation for the multiple operations and refreshing the materialized view according to the equivalent operation. The method is applicable to a materialized view based on multiple base tables on which multiple operations have been performed. The step of determining the equivalent operation can include identifying rows for which an earliest operation is a DELETE operation, or rows for which a latest operation is an INSERT operation, or a combination of the two. The step of refreshing the materialized view includes performing an inverse operation of the equivalent operation to determine a pre-update state of the row, and refreshing the materialized view based on the pre-update state. Additional embodiments are provided which enhance the performance of materialized view refresh queries.

33 Claims, 12 Drawing Sheets (t1) TIME TABLE 102

| TIME_ID | DAY | HOUR | MONTH |
|---|---|---|---|
| 1 | 1 | 01 | JAN 1980 |
| 2 | 1 | 23 | JAN 1980 |
| 3 | 5 | 02 | JAN 1980 |
| 4 | 5 | 08 | JAN 1980 |
| 5 | 6 | 06 | FEB 1980 |
| ⋮ | ⋮ | ⋮ | ⋮ |
| 50 | 3 | 13 | JUL 1985 |

108

(t2) LOCATION TABLE 104

| LOC_ID | STREET | CITY | STATE |
|---|---|---|---|
| 1 | 1st | Santa Clara | CA |
| 2 | Main | Los Angeles | CA |
| 3 | Peachtree | Atlanta | GA |
| 4 | Main | Atlanta | GA |
| 5 | Howard | Santa Clara | CA |
| ⋮ | ⋮ | ⋮ | ⋮ |
| 12 | Kifer | Ogden | UT |

110

(t3) PRODUCT_SALES 106

| SALE_ID | LOC_ID | TIME_ID | TOTAL |
|---|---|---|---|
| 1 | 1 | 4 | $500 |
| 2 | 11 | 3 | $300 |
| 3 | 10 | 1 | $20 |
| 4 | 3 | 3 | $10 |
| 5 | 9 | 70 | $400 |
| ⋮ | ⋮ | ⋮ | ⋮ |
| 5,000 | 5 | 20 | $60 |

SALESREPORT TABLE 202

| MONTH | CITY | SUMSALES |
|---|---|---|
| JAN 1980 | Santa Clara | $50,000 |
| JAN 1980 | Los Angeles | $90,000 |
| JAN 1980 | Atlanta | $30,000 |
| JAN 1980 | Tustin | $15,000 |
| JAN 1980 | Seattle | $70,000 |
| ⋮ | ⋮ | ⋮ |
| JUL 1985 | Ogden | $35,000 |

FIG. 2

TABLES PRIOR TO OPERATIONS ($t_0$)

PRE_TIME 502a

| ROW_ID | TIME_ID | MONTH |
|---|---|---|
| 1 | 1 | JAN 1980 |
| 2 | 2 | FEB 1980 |

PRE_LOCATION 504a

| ROW_ID | LOC_ID | CITY |
|---|---|---|
| 1 | 1 | IRVINE |
| 2 | 2 | SAN JOSE |

PRE_PRODUCT_SALES 506a

| ROW_ID | SALES_ID | LOC_ID | TIME_ID | TOTAL |
|---|---|---|---|---|
| 1 | 1 | 1 | 1 | $300 |
| 2 | 2 | 1 | 2 | $400 |

FIG. 5a

TABLES AFTER FIRST OPERATIONS (t₁)

PRE_TIME 502b

| ROW_ID | TIME_ID | MONTH |
|---|---|---|
| 2 | 2 | FEB 1980 |
| 3 | 3 | MARCH 1980 |

PRE_LOCATION 504b

| ROW_ID | LOC_ID | CITY |
|---|---|---|
| 1 | 1 | IRVINE |
| 2 | 2 | SAN JOSE |

PRE_PRODUCT_SALES 506b

| ROW_ID | SALES_ID | LOC_ID | TIME_ID | TOTAL |
|---|---|---|---|---|
| 2 | 2 | 1 | 2 | $400 |
| 3 | 3 | 2 | 3 | $600 |

FIG. 5b

TABLES AFTER SECOND OPERATIONS (t₂)

PRE_TIME 502c

| ROW_ID | TIME_ID | MONTH |
|---|---|---|
| 1 | 1 | JAN 1980 |
| 2 | 2 | JAN 1980 |
| 3 | 3 | FEB 1980 |

PRE_LOCATION 504c

| ROW_ID | LOC_ID | CITY |
|---|---|---|
| 1 | 1 | IRVINE |
| 2 | 2 | SAN JOSE |

PRE_PRODUCT_SALES 506c

| ROW_ID | SALES_ID | LOC_ID | TIME_ID | TOTAL |
|---|---|---|---|---|
| 1 | 1 | 1 | 1 | $300 |
| 2 | 2 | 1 | 2 | $500 |
| 3 | 3 | 2 | 3 | $500 |

FIG. 5c

TABLES AFTER THIRD OPERATIONS ($t_3$)

POST_TIME 502d

| ROW_ID | TIME_ID | MONTH |
|---|---|---|
| 1 | 1 | DEC 1979 |
| 3 | 3 | JAN 1980 |

POST_LOCATION 504d

| ROW_ID | LOC_ID | CITY |
|---|---|---|
| 1 | 1 | IRVINE |
| 2 | 2 | SAN JOSE |

POST_PRODUCT_SALES 506d

| ROW_ID | SALES_ID | LOC_ID | TIME_ID | TOTAL |
|---|---|---|---|---|
| 1 | 1 | 1 | 1 | $200 |
| 3 | 3 | 2 | 3 | $400 |

FIG. 5d

MLOG$_TIME

| M_ROW$$ | SEQ$$ | OLD_NEW$$ | DMLTYPE$$ | MONTH |
|---|---|---|---|---|
| 1 | 0 | O | D | JAN 1980 |
| 3 | 0 | N | I | MAR 1980 |
| 2 | 0 | O | U | FEB 1980 |
| 2 | 1 | N | U | JAN 1980 |
| 3 | 1 | O | U | MAR 1980 |
| 3 | 2 | N | U | FEB 1980 |
| 1 | 1 | N | I | JAN 1980 |
| 2 | 2 | O | D | JAN 1980 |
| 1 | 2 | O | U | JAN 1980 |
| 1 | 3 | N | U | DEC 1979 |
| 3 | 3 | O | U | FEB 1980 |
| 3 | 4 | N | U | JAN 1980 |

FIG. 6a

MLOG$_PRODUCT_SALES

| M_ROW$$ | SEQ$$ | OLD_NEW$$ | DMLTYPE$$ | TOTAL |
|---|---|---|---|---|
| 1 | 0 | O | D | $300 |
| 3 | 0 | N | I | $600 |
| 2 | 0 | O | U | $400 |
| 2 | 1 | N | U | $500 |
| 3 | 1 | O | U | $600 |
| 3 | 2 | N | U | $500 |
| 1 | 1 | N | I | $300 |
| 2 | 2 | O | D | $500 |
| 1 | 2 | O | U | $300 |
| 1 | 3 | N | U | $200 |
| 3 | 3 | O | U | $500 |
| 3 | 4 | N | U | $400 |

FIG. 6b

INCREMENTAL REFRESH OF MATERIALIZED VIEWS WITH JOINS AND AGGREGATES AFTER ARBITRARY DML OPERATIONS TO MULTIPLE TABLES

FIELD OF THE INVENTION

The present invention relates generally to database management systems and, more specifically, to techniques for incrementally refreshing materialized views with joins and aggregates after arbitrary DML operations to multiple base tables.

BACKGROUND OF THE INVENTION

In a database management system (DBMS), data is stored in one or more data containers, each container contains records, and the data within each record is organized into one or more fields. In relational database management systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Database management systems retrieve information in response to receiving queries that specify the information to retrieve. In order for a database management system to understand the query, the query should conform to a database language recognized by the database management system, such as the Structured Query Language (SQL).

Materialized Views

Computer database management systems that are used for data warehousing frequently store pre-computed summary information in summary tables in order to speed up query processing. The summary tables are often referred to as materialized views. The data from which the materialized views are generated are referred to as base data. The tables that contain the base data are referred to as base tables.

Materialized views typically store aggregated information, such as "sum of PRODUCT_SALES, by region, by month." As new data is periodically added to the base tables or existing data is periodically operated upon, the summary information needs to be updated (i.e., refreshed) to reflect the new base data.

One approach to refreshing materialized views is referred to as the "total refresh" or "full refresh" approach. According to the total refresh approach, the values in materialized views are recalculated based on all of the base data. Systems that employ a total refresh approach have the disadvantage that the recreation process is a relatively lengthy operation due to the size and number of tables from which the summary information is derived. For example, when ten new rows are added to a particular base table that contains a million rows, a total refresh operation would have to process all one million and ten rows of the base table to regenerate the materialized views derived using the base table.

The process of updating summary information contained in materialized views may be improved by performing an incremental refresh during which, rather than generating a new set of summary information based on calculations that use all of the base data, the summary information is updated based on previous summary values and the new base data.

One difficulty associated with performing an incremental refresh is that a single materialized view may contain summarized data derived from multiple base tables. For example, assume that a database includes the three base tables illustrated in FIG. 1. Referring to FIG. 1, a PRODUCT_SALES table 106 contains information about specific sales made by a company. A LOCATION table 104 contains information about where the sales took place. A TIME table 102 contains information about the times at which sales were made.

FIG. 2 illustrates a SALESREPORT table 202 that stores the pre-computed result of an aggregate query based on the PRODUCT_SALES table 106, LOCATION table 104 and TIME table 102. In the specific example given, SALESREPORT table 202 stores the sum of all sales made in each city during each month.

Information that defines a materialized view is referred to herein as a "summary definition". A summary definition indicates (1) the location of the base data that is used to derive the materialized view, and (2) how the base data from the base tables should be aggregated to derive the summarized data. In many systems, summary definitions take the form of queries. For example, the query for the SALESREPORT table 202 may be expressed in a relational database management system using the following SQL language statement which joins the three base tables:

SELECT $t_1$.month, $t_2$.city, SUM ($t_3$.total) sumsales
FROM TIME $t_1$, LOCATION $t_2$, PRODUCT_SALES $t_3$
WHERE $t_1$.time_id=$t_3$.time_id AND
$t_2$.loc_id=$t_3$.loc_id
GROUP BY $t_1$.month, $t_2$.city The "SELECT" line indicates the columns that are to be used to generate the materialized view. The "FROM" line indicates the tables that have those columns. The "WHERE" line indicates the criteria for joining values from one table with corresponding values from the other tables. For example, values in row 108 of TIME table 102, row 110 of LOCATION table 104, and row 112 of PRODUCT_SALES table 106 would be joined together because the time_id value in row 108 matches the time_id value in row 112, and the loc_id value in row 110 matches the loc_id value in row 112.

The "GROUP BY" line indicates that the rows retrieved by the select statement should be put into groups for each month/city combination. The "sum" function in the "SELECT" line indicates that for each of those groups, the values from the "total" column of PRODUCT_SALES table 106 are to be summed. The resulting materialized view will thus have one row for every month/city combination, and that row will have a column called "sumsales" that contains the sum of the "total" column values for that month/city combination.

The SALESREPORT table 202 illustrated in FIG. 2 is an example of the materialized view that would be generated in response to the materialized view definition specified above. The SALESREPORT table 202 has the three columns specified in the "SELECT" line of the materialized view definition: month, city, and sumsales.

If the system that maintains the SALESREPORT table 202 does not support incremental refresh, the query listed above must be run against the base tables each time the base tables are modified. Rather than re-compute the entire contents of SALESREPORT when data is modified or new data is added to the system, it would be more efficient to re-compute just the changes to the existing SALESREPORT that result from the base table data modifications.

Join Operation

To respond to queries, including materialized view queries, a database server typically has to perform numerous table join operations because the database records that contain the information that is needed to respond to the queries are often organized into a star schema. A star schema is distinguished by the presence of one or more relatively large tables and several relatively smaller tables. Rather than duplicating the information contained in the smaller tables, the large tables contain references (foreign key values) to rows stored in the smaller tables. The larger tables within a star schema are referred to as "fact tables", while the smaller tables are referred to as "dimension tables".

When a database management system contains very large amounts of data, certain queries against the database can take an unacceptably long time to execute. The cost of executing a query may be particularly significant when the query requires joins among a large number of database tables.

Aggregate Function

An important function for data generation and retrieval performed by a database management system is the generation of aggregated information. Aggregated information is information derived by applying an aggregate function to the values in a column of a subset of rows in a "base table". Examples of aggregate functions are functions that sum values, calculate averages, and determine minimum and maximum values. The column that contains the values to which an aggregate function is applied is referred to as the measure.

The subsets of rows to which an aggregate function is applied are determined by values in a "group-by" column. The aggregate information generated by a database management system is presented as a result set having the group-by column and the measure column. In particular, the result set has one row for each unique value in the group-by column. Each row in the result set corresponds to the group of rows in the base table containing the value for the group-by column of the row. The measure column in the row contains the output of the aggregate function applied to the values in the measure column of the group of rows.

Aggregate information is generated by a database management system in response to receiving an aggregate query. An aggregate query specifies a group-by column, the measure column, and the aggregate function to apply to the measure values. The following query is provided as an illustration.

SELECT d, SUM(s) sum_s From t
    GROUP BY d

Table t contains data representing the sales of an organization. Each row represents a particular sales transaction. For a particular row in table t, column d contains the date of the sales transaction, and s contains the sale amount.

The SELECT clause contains "SUM(s)", which specifies that the aggregate function "sum" is to be applied to the values in column s of table t. The query also includes the group-by clause "GROUP BY d", which denotes column d as the group-by column.

Execution of this query generates a result set with a column for d and a column for sum (s). A particular row in the result set represents the total sales (s) for all sale transactions in a given day (d). Specifically, for a particular row in the result set, d contains a unique date value from table t for column d. Column sum_s contains the sum of the sales amount values in column s for the group of rows from i that have the unique date value in column d.

It is often useful to generate aggregate information grouped by multiple columns. For example, table i may also contain column r, a column containing values representing regions. It is may be useful to generate a result set that summarizes sales by region, and for each region, sales date. Such a result set may be generated by referencing column r and d in the group-by clause, as illustrated by the following query.

SELECT d, r SUM (s) from t
    GROUP BY r, d

Another useful way to provide aggregate information is to generate one result set that groups data by various combinations of columns. For example, a result set may contain a set of rows grouped by region and date, and a set of rows grouped only by region. Such a result set may be generated by submitting a query that includes multiple subqueries operated upon by the union operator.

Refreshing Materialized Views

High-level relational algebra expressions which are the basis of an incremental refresh algorithm are described, using the following notations:

$T_i$: relational table (pre-update state, before an operation has occurred);

$T_i^+$: relational table (post-update state, after an operation has occurred);

$\Delta T$: delta corresponding to operations (e.g., INSERT, DELETE, or UPDATE) performed on table T;

$\cup$: multi-set addition operation (UNION ALL); and $T_1 \bowtie T_2$: innerjoin between $T_1$ and $T_2$.

Incremental refresh of a materialized view involves updating the materialized view to reflect the operations performed on, or changes made to, the underlying base tables. Thus, for the following materialized view involving a join of two tables, $$MV = T_1 \bowtie T_2,$$

if updates $\Delta T_1$ and $\Delta T_2$ are done to tables $T_1$ and $T_2$, respectively, the post-update versions of the tables, $T_1^+$ and $T_2^+$ are depicted as:

$$T_1^+ = T_1 \cup \Delta T_1; \text{ and}$$

$$T_2^+ = T_2 \cup \Delta T_2.$$

If $MV^+$ represents the new state of the materialized view including the changes to $T_1$ and $T_2$ and $\Delta MV$ represents the changes applied to MV, then $$MV^+ = MV \cup \Delta MV.$$

Alternatively, $$\begin{aligned} MV^+ &= T_1^+ \times T_2^+; &\text{(Expression 1)}\\ &= (T_1 \cup \Delta T_1) \times (T_2 \cup \Delta T_2);\\ &= (T_1 \times T_2) \cup (T_1 \times \Delta T_2) \cup (\Delta T_1 \times (T_2 \cup \Delta T_2));\\ &= MV \cup (T_1 \times \Delta T_2) \cup (\Delta T_1 \times T_2^+); \end{aligned}$$

Hence, $$\Delta MV = (T_1 \bowtie \Delta T_2) \cup (\Delta T_1 \bowtie T_2^+) \qquad \text{(Expression 2)}$$

This generalized representation of a query can be conceptualized as refreshing the materialized view, MV, assuming one table was updated at a time. Thus, assuming $T_2$ was updated first, $T_1$ must be considered in its non-updated or pre-update state. This corresponds to the term $(T_1 \bowtie T_2)$. Once this change has been considered, $T_2$ must now be used in its post-update state, i.e., $T_2^+$. This corresponds to the term $(\Delta T_1 \bowtie T_2^+)$.

Extending this to an MV with n tables, the following expression applies:

$$MV = T_1 \times T_2 \times T_3 \times \ldots \times T_n \quad \text{(Expression 3)}$$

$$\Delta MV = \Delta T_1 \times T_2 \times T_3 \times \ldots \times T_n$$

$$\bigcup T_1^+ \times \Delta T_2 \times T_3 \times \ldots \times T_n$$

$$\ldots$$

$$\bigcup T_1^+ \times T_2^+ \times T_3^+ \times \ldots \times \Delta T_n$$

The above expression essentially represents one way of including all the changes to all of the base tables without counting any of them twice. This expression can be applied in general to any kind of materialized view. If only one table (for example, $T_1$) is updated, then $T_i$ and $T_i^+$ are the same for i not equal to 1, and thus the pre-update state is not required to refresh the materialized view. In addition, if a table (for example, $T_1$) is not updated, then $T_i$ and $T_i^+$ are the same (for example, $T_1 = T_1^+$).

Prior approaches to refreshing materialized views have typically restricted the table operations in some way. For example, one approach requires that only one base table is updated when a view refresh is called. Hence, the pre-update state is not required and the problem is avoided. Such an approach may produce correct results for materialized views with aggregations within a single base table because there is only one table of interest, but, in practice, the assumption or likelihood that only one table has been updated before the refresh is called makes this approach impractical.

Another approach restricts the base table operations to only INSERTs or only DELETEs. Thus, the pre-update state can easily be computed by determining the new rows (for INSERTs) or the rows that are no longer in the table (for DELETEs), and essentially reversing these operations. However, if an arbitrary mix of INSERT, UPDATE and DELETE operations has been performed on more than one table, then the determination of the pre-update state is non-trivial since the same row could have been inserted, updated and deleted many times. Hereinafter, the terms "INSERT," "DELETE," and "UPDATE," when referenced in all capitals, each refer to an independent table operation.

Still another approach is to use a memoryless algorithm. This means that all rows from the materialized view that could have been affected by any of the modified rows of base tables identified in a materialized view change log are removed. Then, the materialized view query is reissued and restricted to the new versions of these rows. Such an approach may be sufficient for materialized views without aggregation, as each row in the base table is individually represented in the materialized view. However, due to the nature of aggregate functions, several rows in a base table are aggregated down to a few rows in the materialized view. Therefore, multiple rows in a base table can affect any particular row in the materialized view. Consequently, a memoryless refresh approach is not efficient since it requires access to rows other than the changed rows. In addition, multiple changes performed on multiple rows in the base table could change any single row in the materialized view. Hence, memoryless refresh may at times be worse than a complete refresh due to the overhead of identifying affected rows.

Based on the foregoing, it is clearly desirable to provide a mechanism that incrementally refreshes a materialized view after arbitrary multiple operations on a row of a base table. Furthermore it is desirable to provide a mechanism that incrementally refreshes a materialized view after operations to rows of multiple base tables.

SUMMARY OF THE INVENTION

A method is provided for incrementally refreshing a materialized view after multiple operations on a row of a base table of the materialized view, by determining an equivalent operation for the multiple operations and refreshing the materialized view according to the equivalent operation. The method is applicable to a materialized view based on multiple base tables on which multiple operations have been performed. Thus, a materialized view defined by a query that joins two or more base tables or that aggregates values from multiple rows of a base table or multiple base tables, can be efficiently refreshed. Furthermore, the method is applicable to operations to base tables which occurred independently of each other and INSERT operations which were performed in bulk.

According to embodiments, the step of determining the equivalent operation can include identifying rows for which an earliest operation from a plurality of operations was a DELETE operation, or rows for which a latest operation from a plurality of operations was an INSERT operation, or a combination of the two. In addition, according to one embodiment, the step of refreshing the materialized view includes performing an inverse operation of the equivalent operation to determine a pre-update state of the row, and refreshing the materialized view based on the pre-update state.

Additional embodiments are described which enhance the performance of materialized view queries. In one such embodiment, the base tables are ordered according to the computational complexity of determining their pre-update state based on the rows operated upon, and the materialized view is refreshed by applying the more complex base tables before the less complex base tables. Other embodiments combine queries for defining rows for which the earliest operation was a DELETE operation or for which the latest operation was an INSERT operation, to form a delta query, and materialize the results of the delta query into a temporary table. Another embodiment creates and uses cardinalities to determining an order according to which the base tables are applied to refresh the materialized view.

Various implementations of the techniques described are embodied in methods, apparatus, and in computer-readable media.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram illustrating base tables that may be used to derive a materialized view;

FIG. 2 is a block diagram illustrating a materialized view that may be derived from the base tables shown in FIG. 1;

FIG. 5a illustrates the state of tables prior to a series of operations thereupon;

FIG. 5b illustrates the state of tables shown in FIG. 5a subsequent to a first operation;

FIG. 5c illustrates the state of tables shown in FIG. 5a subsequent to second operations;

FIG. 5d illustrates the state of tables shown in FIG. 5a subsequent to third operations;

FIG. 6a illustrates a portion of a materialized view log for a table shown in FIG. 5d;

FIG. 6b illustrates a portion of a materialized view log for a table shown in FIG. 5d;

DETAILED DESCRIPTION

A method and apparatus for incremental refresh of a materialized view after a plurality of DML (data-manipulation-language) operations on a row of a base table of the materialized view are described. The term DML refers to any of the INSERT, UPDATE, and DELETE operations performed on a table. In the following description, for the purposes of explanation, numerous specific details are set forth in order to provide a thorough understanding of the present invention. It will be apparent, however, that the present invention may be practiced without these specific details. For example, the invention is described at times referencing an implementation, and thus associated commands, functions, and configuration, in an Oracle9i database available from Oracle Corporation, but practice of the invention is not limited to this database management system. For another example, numerous example database query expressions are presented herein for illustrative purposes, but practice of the invention is in no way limited to using these illustrative queries. In other instances, well-known structures and devices are shown in block diagram form in order to avoid unnecessarily obscuring the present invention.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

Functional Overview

According to an embodiment of the invention, a mechanism is provided for performing an incremental refresh of a materialized view after a plurality of operations on a row of one or more base tables. For the purpose of explanation, embodiments of the invention shall be described in the context of a relational database management system in which the summary data and the base data are stored in relational tables. However, the present invention is not limited to any particular type of database management system, nor any particular form of data containers for the base or summary data.

Figure 4:
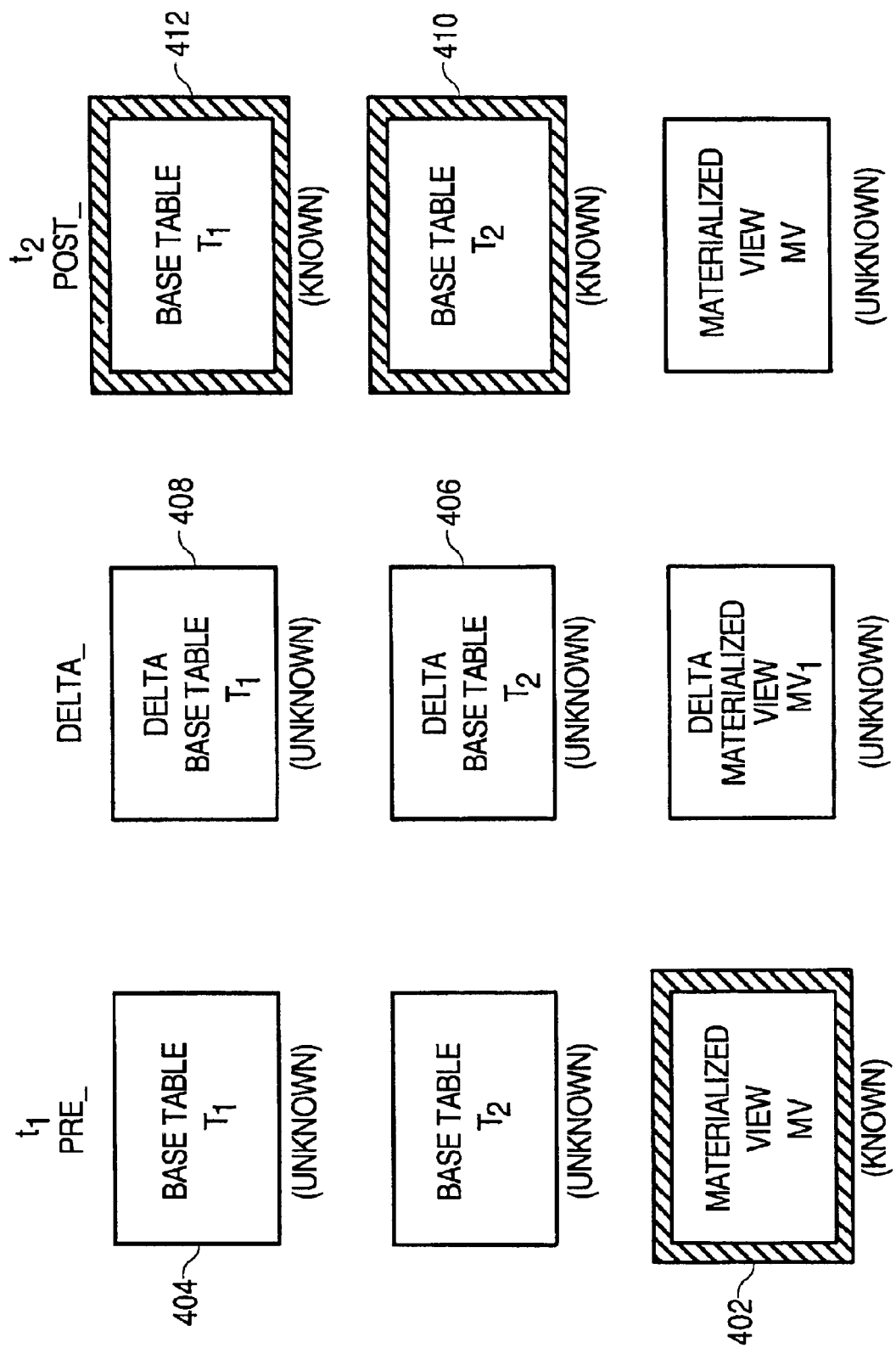
FIG. 4 is a block diagram illustrating various states or pseudo-states of a materialized view and its associated base tables.

FIG. 4 is a block diagram illustrating various states or pseudo-states of a materialized view and its associated base tables. As previously described in Expressions 1 and 2 and the related text, refreshing a materialized view relying on multiple base tables can be expressed as a relation between known and unknown base table and materialized view states or representations. For example, Expression 1, $MV^+ = MV \cup (T_1 \bowtie \Delta T_2) \cup (\Delta T_1 \bowtie T_2^+)$, illustrates that a post-update, or refreshed, materialized view can be computed from the following:

MV 402, which is a known state of the materialized view; specifically, the state after the last materialized view refresh execution (the PRE_state, before the view refresh of interest);

$T_1$ 404, which is an unknown state of the base table $T_1$; specifically, the state which the last materialized view refresh execution utilized (the PRE_state, before any changes subsequent to the last refresh);

$\Delta T_2$ 406, which is an unknown pseudo-state of the base table $T_2$; specifically, a representation of the changes (i.e., table operations) that have been performed on table $T_2$ since the last refresh (hereinafter at times referred to as the DELTA_pseudo-state);

$\Delta T_1$ 408, which is an unknown pseudo-state of the base table $T_1$; specifically, a representation of the changes (i.e., table operations) that have been performed on table $T_1$ since the last refresh (hereinafter at times referred to as the DELTA_pseudo-state); and $T_2^+$ 410, which is a known state of the base table $T_2$; specifically, the current state of the table, on which the desired materialized view refresh is to be based (the POST state).

The term "pseudo-state" is used because the base table typically is never really in such a state; so it is an abstraction used for computational purposes, representing one or more operations that have been performed on the tables. Since the known table states are the PRE_MV 402 state and the POST_$T_1$ 412 and POST_$T_2$ 410 states, the computation essentially reduces to determining the PRE_$T_1$ 404 state and the DELTA_$T_1$ and DELTA_$T_2$ pseudo-states.

According to the techniques described herein, the DELTA_pseudo-states can be represented by an equivalent operation that represents any arbitrary one or more operations on one or more base tables on which the materialized view depends. From the equivalent operation, the PRE_states of the base tables can be computed by performing an inverse operation of the equivalent operation on the known POST_states of the base tables. Hence, the POST_MV can consequently be computed based on the operations performed on the base tables, thus incrementally refreshing the materialized view.

Logging Changes to Base Tables

For several reasons, one of which is to facilitate refreshing of materialized views, all changes to the base tables are typically recorded in a log. In one implementation, there are two mechanisms used to log changes to base tables due to row operations.

One mechanism is called the materialized view log (MV log) and is used to log INSERT, UPDATE, and DELETE operations on individual rows of a base table. The materialized view log typically comprises all of the columns referenced in the materialized view and both the pre-update and post-update values for each referenced column. The MV log also indicates a row identifier (ROWID) of the changed row.

The MV log comprises the following columns used in the methods described herein, in addition to the base table columns that are used by the materialized view. The materialized view log for table T will be called MLOGS_T.

| Column Name | Type |
|---|---|
| M_ROW$$ | ROWID |
| SEQUENCE$$ | NUMBER |
| DMLTYPE$$ | VARCHAR2(1) |
| OLD_NEW$$ | VARCHAR2(1) |

The M_ROW$$ column captures the ROWID for the modified row of the base table. The SEQUENCE$$ column is used to determine the order of operations on each row. As each change is being logged, a corresponding row is added to the MLOG$ T table. Within each MLOG$_T row, the SEQUENCE$$ column is assigned a monotonically increasing unique value, or sequence number. Thus, each operation of a given ROWID will get a unique sequence number and later operations will have a larger sequence number than earlier operations. The DMLTYPE$$ column indicates the type of row operation that has occurred and can have values 'I' (INSERT), 'D' (DELETE), and 'U' (UPDATE). The OLD_NEW$$ column indicates whether the logged row corresponds to the state of the row before or after the operation. In the case of INSERT operations, OLD_NEW$$ has the value 'N' indicating a new value. In the case of DELETE operations, OLD_NEW$$ has the value 'O' indicating an old value. For UPDATE operations, both the old and new values are logged in two separate rows with OLD_NEW$$ values 'O' and 'N' respectively. Also, for updated rows, the pre-update version of the row has a sequence number less than the sequence number of the post-update version. Thus, effectively, an UPDATE on a row is treated as a DELETE of the pre-update row followed by an INSERT of the post-update row.

Another mechanism for logging base table operations relates to a type of INSERT called DIRECT PATH INSERT, which is a fast bulk insert which inserts contiguous ranges of ROWID values. Inserts made through the DIRECT PATH mechanism are logged into a direct load log, which only maintains the ROWID ranges inserted but does not log the individual column values.

The direct load log is a system-wide log named ALL_SUMDELTA that does not log information on a per table basis but logs any rows corresponding to bulk inserts to any table, and has the following or comparable columns.

| Column Name | Type |
|---|---|
| TABLEOBJ# | NUMBER |
| LOWROWID | ROWID |
| HIGHROWID | ROWID |
| SEQUENCE | NUMBER |

Each table is identified by the TABLEOBJ#. The LOWROWID and HIGHROWID columns store the bounds of the ROWID ranges for the bulk INSERT. Each ROWID range is assigned a sequence number, using the same sequence as the materialized view log. The sequence number can be used to determine the ordering of various direct loads and also between direct loads and other conventional, or independent, base table operations. It is acceptable to assign the same sequence number to all of the rows corresponding to a ROWID range in ALL-SUMDELTA because it is still possible to find the order of operations on a given row.

Computation of Delta Rows and the Pre-Update State of a Base Table

In this section, the following schema with two tables is used as an example, but the techniques described can be generalized to any number of tables.

CREATE TABLE F (a integer, b integer, c integer);
CREATE TABLE T (a integer, b integer, c integer).

Each of the tables has a materialized view log (MLOG$_F and MLOG$_T), such as described above. Furthermore, a materialized view represented by the following query is used for illustrative purposes.

SELECT t.b, t.c, COUNT(*) as f_cstar
FROM F f, T t
WHERE f.a=t.a
GROUP BY t.b, t.c.

As previously described, if more than one base table associated with a materialized view is operated upon, then a refresh of the materialized view involves computation of the pre-update state of at least one of the base tables. Computation of the pre-update state for a base table is straightforward when the operations performed on that base table consist of INSERTs only or DELETEs only.

For example, if the operations consist of a series of INSERTs only, then the pre-update state can be computed by removing the inserted rows from the known post-update state of the table. In the absence of any DIRECT PATH INSERTs, the following query could be used to identify the delta rows, or inserted rows, for table T from the corresponding MV log:

INS_DELTA_T:
SELECT L.m_row$$ rid, L.a, L.b, L.c
FROM mlog$_T L
WHERE L.old_new$$='N'.

The pre-update state of rows for table T can consequently be determined by the following query:

PRE_T:
SELECT*
FROM T
WHERE ROWID NOT IN
  (SELECT rid FROM INS_DELTA_T).

For another example, if the INSERTs to the base table used only the DIRECT PATH for bulk INSERTs, the following queries provide the delta rows and the pre-update state, respectively, of the table T from the ALL_SUMDELTA log:

INS_DELTA_T:
SELECT t.rowid rid, t.a, t.b, t.c, t.d
FROM T t, ALL_SUMDELTA l
WHERE (t.rowid between l.lowrowid and l.highrowid)
  AND (l.obj#=<tableobj# of T>);
PRE_T:
SELECT t.*
FROM T t
WHERE t.rowid NOT IN
  (SELECT rid FROM INS_DELTA_T).

In the presence of both DIRECT PATH and conventional (or independent) row INSERTs, the INS_DELTA_T would consist of a UNION ALL of each INS_DELTA_T query presented above, while the definition of PRE_T is as presented in the INSERT only example.

If the base table operations consist of a series of DELETEs only, the pre-update state of the table can be computed by adding to the table the rows that were deleted. The following expression could be used to identify the delta rows for the DELETE only case:

DEL_DELTA_T:
SELECT L.a, L.b, L.c
FROM mlog$_tL
WHERE L.old_new$$='O';

The pre-update state of rows for table T can be determined by the following query,

PRE_T:
SELECT * FROM T
UNION ALL
SELECT * FROM DEL_DELTA_T

Once delta rows are computed, the delta for the entire base table can be computed by the following query:

DELTA_T: (Expression 4)

(SELECT a, b, c, 'D' as dml
  FROM DEL_DELTA_T)
UNION ALL
(SELECT a, b, c, 'I' as dml
  FROM INS_DELTA_T);

where the marker 'D' or 'I' in the delta summary above is used to tag the column in the aggregate with +(−) sign if the row is inserted (deleted).

Hence, the pre-update state of a base table T, which can be used to refresh the materialized view, can be provided by the following query:

PRE_T: (Expression 5)

(SELECT *
  FROM T
    WHERE ROWID NOT IN
      (SELECT RID FROM INS_DELTA_T))
UNION ALL
(SELECT *
  FROM DEL_DELTA_T)

Determining an Equivalent Operation for Multiple Operations To a Row

The previous examples involved cases in which base tables were changed by INSERT operations only or DELETE operations only. To compute a pre-update state of a row of a base table that has experienced an arbitrary combination of operations, such as INSERT, DELETE, and UPDATE, the operations upon a particular row are represented by an equivalent operation.

TABLE 1

| First DML | Last DML | Equivalent DML |
|---|---|---|
| Insert | Insert | Insert $V_n$ |
| Insert | Delete | NOP |
| Insert | Update | Insert $V_n$ |
| Delete | Insert | Delete $V_o$, Insert $V_n$ |
| Delete | Delete | Delete $V_o$ |
| Delete | Update | Delete $V_o$, Insert $V_n$ |
| Update | Insert | Delete $V_o$, Insert $V_n$ |
| Update | Delete | Delete $V_o$ |
| Update | Update | Delete $V_o$, Insert $V_n$ |

Table 1 is a table depicting equivalent operations for a series of operations, with "DML" representing a base table row operation. For any particular row of a base table, if the old or original value (i.e., the value before the first operation on that row and column; hereinafter $V_o$) of the column that has been changed is known, and the new or final value (i.e., the value after the last operation on that row and column; hereinafter $V_n$) is known, all of the operations on that row can be represented by an equivalent operation or operations as depicted in Table 1 because all intermediate operations are considered inconsequential. For example, if a row is inserted into a base table and subsequently updated numerous times, this series of operations can be equivalently represented as a single insert of the last updated value such that the equivalent operation is "Insert $V_n$" (as illustrated in the shaded row of Table 1). In another example, if a row is updated numerous times before being deleted, the equivalent operation with respect to the materialized view is "Delete $V_o$". "NOP" represents "No Operation."

Thus, Table 1 enumerates the effect on the materialized view, represented as an equivalent operation, for all combinations of first and last operations to a particular row of a base table. For any given row, there are at most two operations that define or represent the equivalent operation, "Delete $V_o$" and "Insert $V_n$". Upon determination of the equivalent operation for one or more operations on a row of a base table, the pre-update state of the base table can be computed according to Expression 5, and thus, the materialized view can be refreshed based on Expression 1.

The computation of the equivalent operation for a given row relies on the ability to determine the first and last operation on the row. A method for achieving this includes assigning each operation in the MV logs a monotonically increasing sequence number, such as the values automatically inserted into the SEQUENCE$$ column described above. As such, the first operation on any row is the one that has the least sequence number (MIN(sequence$$)) and the last operation on any row is the one that has the largest sequence number (MAX(sequence$$). In addition, the OLD_NEW$$ column of the MV log is called upon for use in conjunction with the SEQUENCE$$ column to determine rows on which the latest, or last, operation was an INSERT operation and rows on which the earliest, or first, operation was a delete operation (e.g., a strict DELETE or an UPDATE). As described, an UPDATE operation is treated as a DELETE followed by an INSERT. Hence, the following queries are examples of expressions that can be used to compute the delta rows, from the MV log only (thus, deltas due to independent, not bulk, operations), for the DELETE and INSERT deltas, respectively. The following query finds the rows for which the earliest operation was a DELETE operation.

DEL_DELTA_T: (Expression 6)

SELECT L.m_row$$ rid, L.a, L.b, L.c, 'D' as marker
FROM mlog$_t L
WHERE L.old_new$$='O'
  AND L.sequence$$ IN (SELECT MIN(sequence$$)
    FROM mlog$_t
    GROUP BY m_row$$).

The following query finds the rows for which the latest operation was an INSERT operation.

INS_DELTA_T: (Expression 7)

SELECT L.m rows$$ rid, L.a, L.b, L.c, T as marker
FROM mlog$_t L
WHERE

AND L.old_new$$='N'
AND L.sequence$$ IN (SELECT MAX(sequence$$)
   FROM mlog$_t
   GROUP BY m_row$$)).

These expressions can be utilized in the expressions for the pre-update state presented above, as in, for example, Expression 5.

In a case where bulk INSERTs have been enacted through a DIRECT PATH operation, in addition to conventional operations, the bulk inserts (i.e., direct loads) are logged into the direct load log as discussed above. The direct load log also has a sequence number for each ROWID range inserted, using the same sequence as the materialized view log, thus the relative position of the direct load to the conventional operations is determinable. Note that the sequence numbers must be unique only for each ROWID within a base table and each ROWID range has distinct ROWDs, and so all of the rows in a direct load range can share the same sequence number.

TABLE 2

| First DML | Last DML | Equivalent DML |
|---|---|---|
| Insert | Insert | Insert $V_n$ |
| Insert | Delete | NOP |
| Insert | Update | Insert $V_n$ |
| Insert | Direct Load | Insert $V_t$ |
| Delete | Insert | Delete $V_o$, Insert $V_n$ |
| Delete | Delete | Delete $V_o$ |
| Delete | Update | Delete $V_o$, Insert $V_n$ |
| Delete | Direct Load | Insert $V_t$ |
| Update | Insert | Delete $V_o$, Insert $V_n$ |
| Update | Delete | Delete V |
| Update | Update | Delete $V_o$, Insert $V_n$ |
| Update | Direct load | Insert $V_t$ |
| Direct Load | Insert | Insert $V_n$ |
| Direct Load | Delete | NOP |
| Direct Load | Update | Insert $V_n$ |
| Direct Load | Direct Load | Insert $V_t$ |

Table 2 is an extension table to Table 1, depicting equivalent operations for a series of operations on a row. Table 2 includes the series of operations in which either the first or last operation is from a direct load. Again, $V_o$ and $V_n$ refer to the initial values before the first operation and final values after the last operation, respectively, from the MV log. $V_t$ refers to the final values, or post-update values, of a row after the last direct load operation. Due to the nature of the ALL_SUMDELTA log, the values of the row at the time of the direct load are not available, only the ROWID value is available. If the direct load is the last operation on the table, then the values for the rows may be obtained from the base table itself. The state of the row resulting from the direct load is not available if another operation further updated the row, thus, only the ROWID of the rows operated upon is available. However, as presented in Table 2, the only values needed to compute an equivalent operation when direct load is not the last operation can be obtained from the MV log. Therefore, the problem can be reduced to determining whether a direct load occurred as the first operation to the row, the last operation to the row, or as an intermediate operation to the row.

Determining the sequence of operations on a row can be determined by combining the MV log (MLOG$_T) and the direct load log (ALL_SUMDELTA), as in the following expression. This expression selects all of the rows from the MV log and all of the rows from a join of the direct load log to the base table, and unions the results.

COMBINED_LOG T: (Expression 8)

(SELECT L.M_ROW$$ RIDS$, L.a, L.b, L.c, L.old_new$$, L.sequence$$ seq$$

FROM mlog$_t L)
UNION ALL
(SELECT T.rowid RID$$, T.a, T.b, T.c, 'N' old_new$$,
   s.sequence seq$$
FROM T, ALL_SUMDELTA s
WHERE s.TABLEOBJ#=<tableobj# of T>
   AND T.rowid BETWEEN s.LOWROWID AND
      s.HIGHROWID)

Note that the join operation is a range join between the base table's ROWIDs and the bound values of the ROWID range in the direct load log. Further note that the old_new$$ value for the direct load log is always 'N', indicating INSERTs. The combined log can be queried as if it was an MV log (mlog$t), which is described below in Expression 9.

EXAMPLE

The materialized view incremental refresh techniques described herein shall now be described with reference to an example illustrated in FIGS. 5a, 5b, 5c, 5d, 6a, and 6b.

FIG. 5a illustrates the state of tables 502a, 504a, and 506a prior to a series of operations thereupon, at time to. Those tables shall be respectively referred to herein as PRE_TIME 502a, PRE_LOCATION 504a, and PRE_PRODUCT_SALES 506a.

FIG. 5b illustrates the state of the tables 502b, 504b, and 506b subsequent to a first operation on tables 502a and 506a, at time $t_0$. Specifically, one row was deleted (ROWID 1) and another row (ROWID 3) has been inserted in the _TIME and the _PRODUCT_SALES tables.

FIG. 5c illustrates the state of the tables 502c, 504c, and 506c subsequent to second operations on tables 502b and 506b, at time $t_2$. Specifically, two rows (ROWID 2 and ROWID 3) were updated, and one row was inserted (ROWID 1) in the _TIME and the _PRODUCT_SALES tables.

FIG. 5d illustrates the state of the tables 502d, 504d, and 506d subsequent to third operations on tables 502c and 506c, at time $t_3$. Specifically, one row was deleted (ROWID 2), and two rows (ROWID 1 and ROWID 3) were updated in the _TIME and _PRODUCT_SALES tables. Tables 502d, 504d, and 506d represent the post-update state of the base tables, i.e., POST_TIME, POST_LOCATION, and POST_PRODUCT_SALES. As can be appreciated, an arbitrary mix of conventional operations has been performed on multiple tables, i.e., the TIME 502a and the PRODUCT_SALES 506a tables. The state of the tables 502a, 504a, and 506a represents the state upon which the materialized view will be refreshed.

FIG. 6a illustrates a relevant portion of the materialized view log (MLOG$_TIME) for table POST_TIME 502d, which describes the sequence of operations performed on the TIME table, as depicted in FIGS. 5b–5d. As described above, the computation of the equivalent operation for a given row relies on the ability to determine the first and last operation on the row. Therefore, with respect to ROWID 1, the MLOG$_TIME table shows, based on the sequence number SEQ$$, that the first operation (SEQ$$=0) on this row was a DELETE operation, and the last operation (SEQ$$=3) on this row was an UPDATE operation, which is represented as a DELETE followed by an INSERT. This could be determined by applying Expressions 6 and 7 (or Expression 9 for performance enhancement) to MLOG$_TIME, thus, finding the row with minimum sequence number in the SEQ$$ field and an "0" in the OLD_NEW$$ field, indicated as row 602 in FIG. 6a, and the row with the maximum sequence number in the SEQ$$ field and an "N" in the OLD_NEW$$ field, indicated as 604 in FIG. 6*a*.

Referring to Table 1 shows that an equivalent operation for a series of operations that starts with a DELETE and ends with an UPDATE is "DELETE $V_o$, INSERT $V_n$." Reference to row 602 shows that V. for ROWID 1 is "JAN 1980," indicated as data 606, and reference to row 604 shows that $V_n$ for ROWID 1 is "DEC 1979," indicated as data 608. Consequently, the DELTA_TIME pseudo-state for ROWID 1 can be represented as "Delete JAN 1980, Insert DEC 1979."

Recall that in this example, the pre-update state of the TIME table (PRE_TIME 502*a*) is an unknown. In order to determine the pre-update state, an inverse operation of the equivalent operation is applied to the post-update state of the TIME table (POST_TIME 502*d*), a known state. Expression 5 (or Expression 9 for performance enhancement) can be used to compute the pre-update state of the TIME table. Simply stated, to determine PRE_TIME 502*a*, apply a DELETE Vn and an INSERT V. to POST_TIME 502*d*. That is, delete "DEC 1979" and insert "JAN 1980" which produces the table shown as 502*a* in FIG. 5*a*.

A similar process as described above is performed on ROWID 2 and ROWID 3 of the TIME table, which would show that the first operation (SEQ$$=0) on ROWID 2 is represented as a DELETE operation (extracted from the UPDATE operation), and the last operation (SEQ$$=2) on this row was a DELETE operation; and the first operation (SEQ$$=0) on ROWID 3 was an INSERT operation, and the last operation (SEQ$$=4) on this row is represented as a DELETE operation (extracted from the UPDATE operation). Note from tables 502*a–d* that, in fact, ROWID 3 experienced a series of operations: INSERT, UPDATE, UPDATE.

Hence, the equivalent operation for ROWID 2 is, as shown in Table 1, "Delete $V_o$." V. for ROWID 2 is shown as data 610, "FEB 1980," which is inserted into POST_TIME 502*d* to arrive at the pre-update state of the row, as depicted in PRE_TIME 502*a*. The equivalent operation for ROWID 3 is, as shown in Table 1, "Insert $V_n$." $V_n$ for ROWID 3 is shown as data 612, "JAN 1980," which is deleted from POST_TIME 502*d* to arrive at the pre-update state of the row, as depicted in PRE TIME 502*a*.

FIG. 6*b* illustrates a relevant portion of the materialized view log (MLOG$_PRODUCT_SALES) for table POST_PRODUCT_SALES 506*d*, which describes the sequence of operations performed on the PRODUCT_SALES table, as depicted in FIGS. 5*b*–5*d*. The process described above for the TIME table is applied similarly to the PRODUCT_SALES table, in its various states represented as 506*a–d*. That is, the DELTA pseudo-state and the pre-update state is computed for the PRODUCT_SALES table, addressing each row that has been operated upon subsequent to the last materialized view refresh. Note from Expressions 1–3, that for a materialized view depending on n base tables, n DELTA pseudo-states but only n–1 pre-update states need be computed to refresh the materialized view. Thus, in this example, computations on the PRODUCT_SALES table could stop after computing the DELTA pseudo-state, or essentially after determining the equivalent operation.

Once the necessary DELTA and/or pre-update states have been computed for each base table of the materialized view that has experienced operations since the last refresh, Expressions 1, 2, or 3 can be applied, utilizing the last known state of the materialized view, to refresh the materialized view according to the arbitrary sequences of operation on the multiple base tables. Consequently, the refreshed materialized view will contain the new aggregated values resulting from the base table operations.

Method of Refreshing a Materialized View

Figure 7:
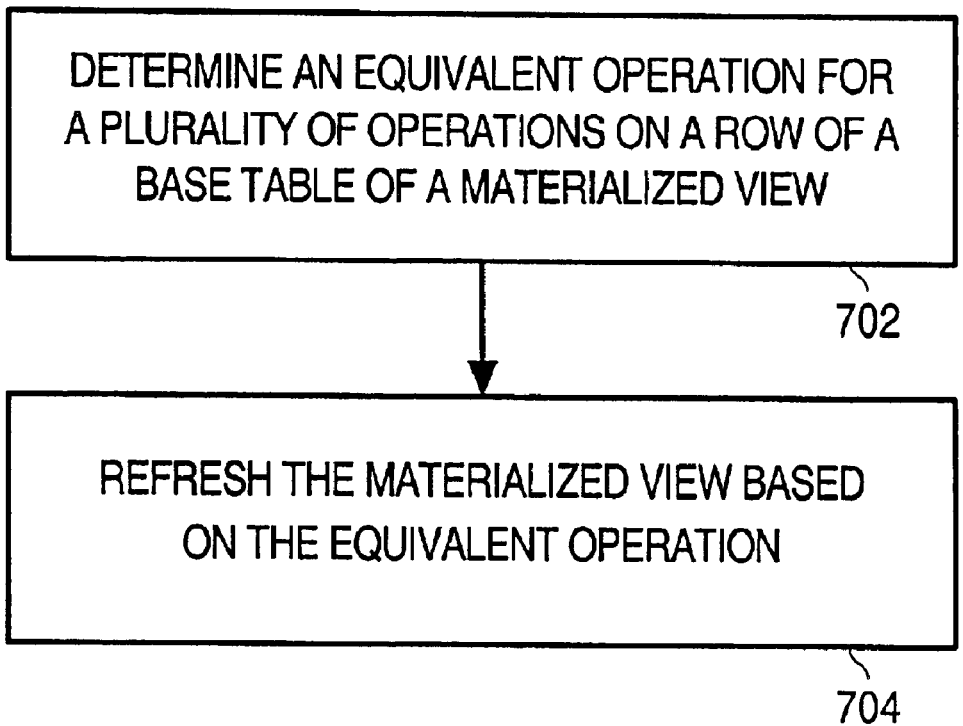
FIG. 7 is a flow diagram illustrating a method for refreshing a materialized view, according to an embodiment of the invention.

FIG. 7 is a flow diagram illustrating a method for refreshing a materialized view, according to an embodiment of the invention. At step 702, an equivalent operation for a plurality of operations on a row of a base table of a materialized view is determined. This step is exemplified in the Example above. At step 704, the materialized view is refreshed based on the equivalent operation determined in the previous step.

Various techniques may be used to incrementally refresh a materialized view, some of which are known in the art. One technique is described in U.S. Pat. No. 6,205,451, issued Mar. 20, 2001, and entitled "METHOD AND APPARATUS FOR INCREMENTAL REFRESH OF SUMMARY TABLES IN A DATABASE MANAGEMENT SYSTEM," the contents of which are incorporated herein by reference.

Figure 8:
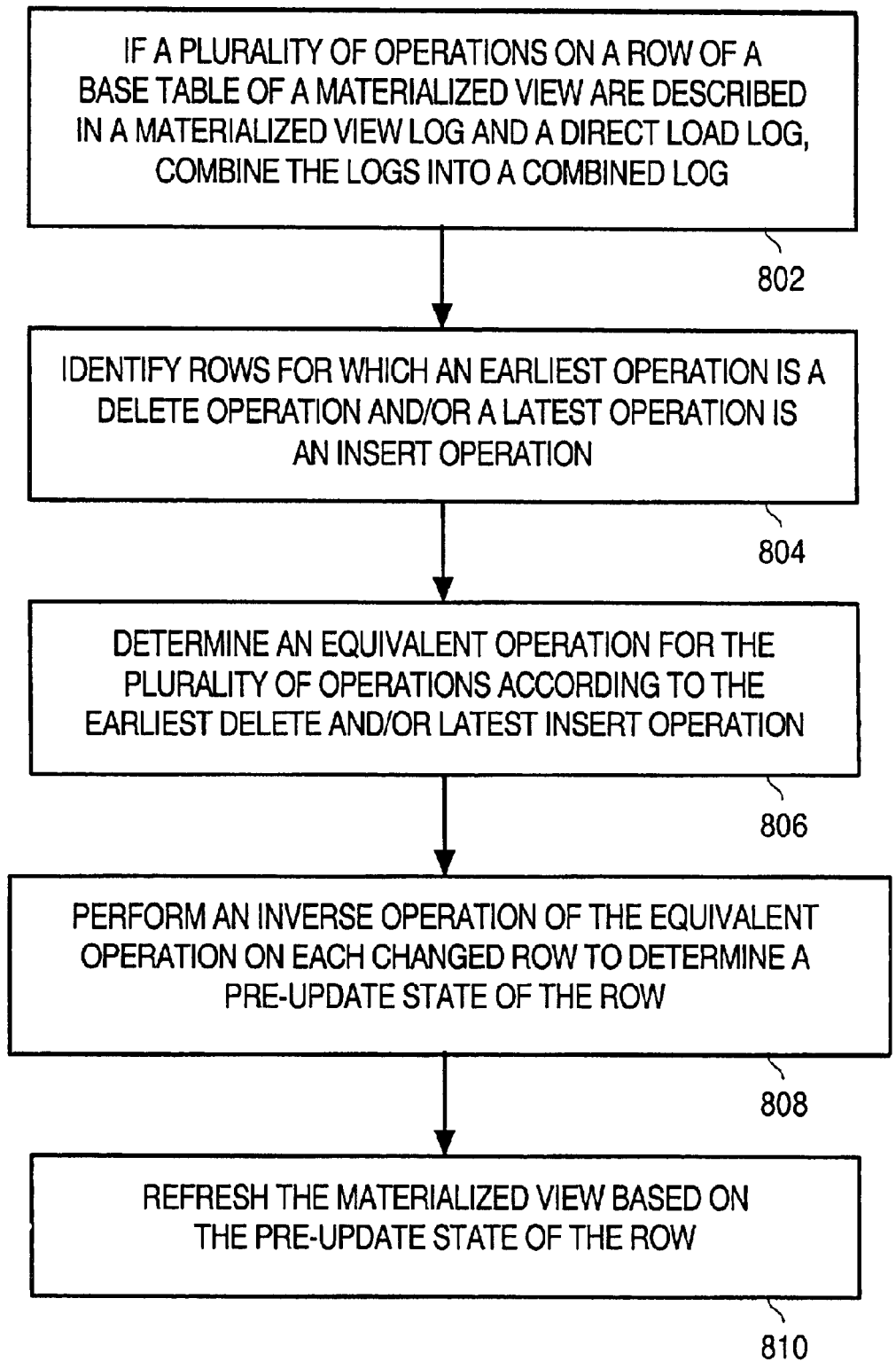
FIG. 8 is a flow diagram illustrating a method for refreshing a materialized view, according to an embodiment of the invention.

FIG. 8 is a flow diagram illustrating a method for refreshing a materialized view, according to an embodiment of the invention. If a plurality of operations on a row of a base table of a materialized view are described in a materialized view log and a direct load log, then at step 802, the materialized view log and the direct load log are combined. This step can be performed by executing Expression 8, or a similar query. At step 804, an earliest delete operation and/or a latest insert operation, within the plurality of operations, is identified. This step can be performed by executing the expression corresponding to DLT_T$$ in Expression 9, or a similar query. At step 806, an equivalent operation for the plurality of operations is determined according to the earliest delete and/or latest insert operations. An inverse operation of the equivalent operation is performed on the row to determine a pre-update state of the row, at step 808, which can be performed by executing Expression 5, or the expression corresponding to main query block of Expression 9, or a similar query. At step 810, the materialized view is refreshed based on the pre-update state of the row.

Various computational performance-enhancing, or optimization methods, which represent embodiments of the present invention, are described below. Optimization is the process of choosing the most efficient way to phrase and execute a SQL statement. This is an important step in the processing of any Data Manipulation Language statement (SELECT, INSERT, UPDATE, or DELETE). There may be many different ways for a database management system to execute such a statement, varying, for example, which tables or indexes are accessed in which order. The procedure used to execute a statement can greatly affect how quickly the statement executes. An optimizer program is typically used to choose an execution process that it determines to be the most efficient, and considers a number of factors in making a choice among its alternatives.

Improving Performance Through Partitioning and Materialization

The computational performance of Expressions 6 and 7 is increased significantly by combining them into a single query, and thus, determining both the insert delta and delete delta together. An example query that combines the insert and delete deltas, that materializes the combined delta statement into a temporary table, that computes the pre-update state (all in the main query block), and which utilizes analytic functions to provide enhanced performance, follows:

```
WITH DLT_T$$ AS                                    (Expression 9)
    (SELECT d.RID$$, a, b, c, OLD_NEW$$
    FROM (SELECT t.*
        MIN(t.SEQ$$) OVER (PARTITION BY t.RID$$) MINSEQ#,
        MAX(t.SEQ$$) OVER (PARTITION BY t.RID$$) MAXSEQ#
      FROM (SELECT M_ROW$$ RID$$, a, b, c, SEQUENCE$$ SEQ$$,
    OLD_NEW$$
            FROM mlog$_t) t
      ) d
    WHERE (d.OLD_NEW$$ = 'O' AND (d.SEQ$$ = d.MINSEQ#)) OR
            (d.OLD_NEW$$ = 'N' AND (d.SEQ$$ = d.MAXSEQ#)))
    (SELECT rowid, a, b, c                         [INS_DELTA]
    FROM t
    WHERE rowid NOT IN
        (SELECT RID$$
        FROM
        DLT_T$$
        WHERE OLD_NEW$$= 'N')
    )
    UNION ALL
    (SELECT RID$$, a, b, c                         [DEL_DELTA]
    FROM DLT_T$$
    WHERE OLDNEW$$ = 'O'
).
```

The temporarily materialized query for DLT_T$$ computes the MIN and the MAX sequence number for each rowid and selects the rows from MLOG$_T corresponding to the earliest DELETE operation or the latest INSERT operation. This is used to compute the pre-update state in the main query block (i.e., the INS_DELTA and the DEL_DELTA branches of the UNION ALL). The use of analytic functions make the query much simpler by avoiding self-joins and "Group by" aggregation. The expression for DLT_T$$ is logically equivalent to a "UNION ALL" of Expressions 6 and 7, but more efficient.

In addition, the combined delta statement is materialized into a temporary table using a WITH clause so that it can efficiently be reused multiple times. Running multiple queries is relatively slow because tables (MLOG$_T, in this case) are accessed multiple times for each returned row. It is faster to cache the values from a complex query in a temporary table, then run the queries against the temporary table. A temporary table provides a mechanism for running a computation once, and caching the result in later queries and joins. Furthermore, in complex queries that process the same subquery multiple times, the WITH clause lets the subquery be factored out, given a name, and then referenced multiple times within the original complex query. This technique lets the optimizer program choose how to deal with the subquery results, i.e., whether to create a temporary table or treat it as an inline view.

There is a case that necessitates special handling, that is when a row was inserted using a direct load as the first operation on that row, and after some changes the row was finally deleted from the table. From Table 2, it is shown that the equivalent operation for this case is a NOP (No Operation). However, using Expression 9 with the combined log determined from Expression 8, the row would appear as a delete in the MV log but would not appear in the join between the direct load log and the base table because the ROWID is no longer present in the base table. Without special handling, the equivalent operation would be considered a DELETE, which would yield incorrect results. To handle this case, in one embodiment, the case is detected, and the affected rows are added as an INSERT to the pre-update state query to compensate for the extra DELETE. Note that this extra statement is only added if DELETEs have occurred. As long as the row is initially or finally present in the base table, the equivalent operation is determinable using Expression 9.

Such a special case is detected by determining whether there were any direct loads with a subsequent DELETE operation. This is partially accomplished by checking for row operations with a sequence number (SEQUENCE$$) larger than direct load sequence number for the same ROWID. This can be accomplished with the following query:

```
SPECIAL DELETES
SELECT L.rowid, L.a, L.b, L.c, 'N' OLD_NEW$$
    FROM mlog$_t L, ALL_SUMDELTA s
    WHERE s.TABLEOBJ#=<tableobj# of T>
        AND L.m_row$$ BETWEEN s.LOWROWID
            AND s.HIGHROWID
        AND L.SEQUENCE$$>s. SEQUENCE
        AND L.dmltype$$='D'
        AND L.m_row$$ between 'RID1' AND 'RID2';
```

For performance reasons, in such a query in which the MV log is joined with the direct load log, restricting the rows from the MV log is advantageous. In one embodiment, the rows of the MV log are restricted by selecting only DELETEs. Further, ranges of ROWIDs on which direct loads were performed are determined by finding the minimum LOWROWID and the maximum HIGHROWID from the direct load log. This results in an efficient query that can be effectively computed using parallelization. An efficient execution plan for the SPECIAL DELETES query could use a SORT MERGE join on MLOG$_T and ALL_SUMDELTA. In parallel, ALL_SUMDELTA could be broadcasted and MLOG$_T distributed by round robin on M_ROW$$.

Another method for improving the performance of the handling of the special case involves transforming non-equi joins into equi-joins. This method, referred to as band join, is performed by doing a one-to-one mapping of ROWIDs to numbers such that for any two ROWIDs (RID1 and RID2) and their mappings (N1 and N2), RID1<RID2 implies N1<N2. Next, the following is determined: (1) the minimum number and maximum number mapped to in the ALL_SUMDELTA table; and (2) the largest range of mapped numbers in the ALL_SUMDELTA table, which can be determined with the following query.

```
SELECT MIN(f(LOWROWID)) min_rid, MAX(f
    (HIGHROWID)) max_rid,
    MAX(f(HIGHROWID)-f(LOWROWID)) max_
        range
FROM ALL_SUMDELTA;
``` where f is the one-to-one mapping of ROWIDs to numbers. Next, the complete range min_rid to max_rid is split into blocks of size equal to max_range. This can be performed using the following function.

$$MAP(x)=((x-min\_rid)DIV(max\_range))$$

Each row of ALL_SUMDELTA is mapped using the f(LOWROWID) as the argument of the MAP function. The SPECIAL DELTES query can be rewritten using equi-join operations, which can use HASH JOIN between MLOG$_T and ALL_SUMDELTA, which is a more efficient computation due to avoiding a sort operation. Furthermore, in parallel, both ALL_SUMDELTA and MLOG$_T can be distributed by hashing on the respective equi-join keys, which is a more efficient computation than broadcasting of ALL_SUMDELTA.

Improving Performance Through Cardinality Hints

The MV log (MLOG$_T) and direct load log (ALL_SUMDELTA) tables are typically not analyzed by the user and in the absence of cardinality estimates, the execution plans can deviate significantly from the most efficient plan. The term cardinality refers to the number of cardinal, or basic, items in a set. In a table, such as a database table, the number of rows is used to define the cardinality of the table.

To assist in efficiently refreshing a materialized view, a concept of table cardinality is used to indicate in the refresh expression, the number of rows in a base table that have been operated upon and thus, the number of rows that are considered during the refresh process. Passing a hint to the optimizer forces it to use an optimal execution plan. In one embodiment, the cardinalities are derived from the MV log or the direct load log, by issuing COUNT(*) queries before generating the refresh expressions and by adding appropriate hints into the select list of the delta/pre-update expressions. In this embodiment, a cardinality for inserted rows is determined from the MV log, a cardinality for deleted rows is determined from the MV log, and a cardinality for bulk inserted rows is determined from the direct load log.

A query that can be issued to collect the cardinality of rows from the MV log is:

SELECT OLD_NEW$$, COUNT(*) cnt
FROM MLOG$_T
GROUP BY OLD_NEW$$.

Similarly, the cardinality of rows coming from the direct load log can be estimated by the following query:

SELECT SUM(BLOCK_NUM(HIGHROWID)-
    BLOCK_NUM(LOWROWID)+1)*AVG_ROWS_
    PER_BLK cnt, COUNT(*) cnt_star
FROM ALL_SUMDELTA.

The cardinalities determined above are passed as hints to the view refresh expressions. For example, an expression for determining the pre-update state of a table can take the form as follows:

```
WITH DLT_T$$ AS                                    (Expression 10)
    (SELECT d.RID$$, a, b, c, OLD_NEW$$
    FROM (SELECT t.*
        MIN(t.SEQ$$) OVER (PARTITION BY t.RID$$) MINSEQ#,
        MAX(t.SEQ$$) OVER (PARTITION BY t.RID$$) MAXSEQ#
    FROM (COMBINED_LOG_T
        UNION ALL
        SPECIAL_DELETES) t
    ) d
    WHERE (d.OLD_NEW$$ = 'O' AND (d.SEQ$$ = d.MINSEQ#)) OR
        (d.OLD_NEW$$ = 'N' AND (d.SEQ$$ = d.MAXSEQ#)))
    (SELECT rowid, a, b, c                         (Expression 10.1)
    FROM t
    WHERE rowid NOT IN
        (SELECT /*+ CARDINALITY (c1+c2) */
            RID$$
        FROM DLT_T$$
        WHERE OLD_NEW$$ = 'N')
) UNION ALL
(SELECT /*+ CARDINALITY (c3) */
    RID$$, a, b, c
    FROM DLT_T$$
    WHERE OLDNEW$$ = 'O');
``` wherein c1 = cardinality of new rows from the MV log;
c2 = cardinality of new rows from the direct load log; and
c3 = cardinality of deleted rows from the MV log.

The cardinality hints are useful in choosing between a NESTED LOOP versus a HASH ANTI JOIN operation when accessing the base tables in Expression 10.1. These also assist the optimizer program in choosing the right plans in the main refresh query.

Union All Expansion

In the presence of DELETEs to multiple base tables, the pre-update state SQL statement, e.g., Expression 5, involves a UNION ALL command. A UNION operation merges the results from any combination of two or more queries, or SELECT statements, or tables, into a single result set, or table, comprising all of the rows belonging to all of the queries, etc. By default, the UNION operation only returns unique records, but using the ALL predicate returns all records, even duplicates. The optimizer may not be able to generate the efficient refresh plan when there are sub-queries with UNION ALL in the FROM clause of a query. To avoid this situation, the UNION ALL command can be expanded.

The FROM clause of the query is typically represented as: $t1 \times (t2 \forall \Delta t2)$; which can be rewritten as $(t1 \times t2) \cup (t1 \times \Delta t2)$. Hence, the optimizer program can optimize each branch of the UNION ALL separately. The first branch referencing tables t1 and t2 would have access to the statistics typically already computed for both tables and can utilize any existing indices on the tables. Without this UNION ALL expansion, any index on t2 could not have been used, as it occurs as a UNION $(t2 \cup \Delta t2)$. In addition, after the expansion, the branch referencing the small table $\Delta t2$ can benefit from the cardinality hint, described above, passed to the SQL query, and the cardinality hint helps the optimizer program determine the build and probe phases of the Hash join for $t1 \times t2$.

Reducing Recomputation of the Delta MV

As described above, once the delta and pre-update states are determined for a base table, they are used to compute the change in the materialized view (delta MV) as expressed in Expression 3. For each component of delta MV resulting from each base table, a refresh pass is performed, through which the materialized view is updated to reflect changes from that component. Each pass can be described as an "apply" operation. There are as many apply operations as the number of table updated.

If an INSERT operation performed on a base table contributes to an existing group in the materialized view, the corresponding "apply" operation on the materialized view involves updating the values of aggregates for that group. If an INSERT operation performed on a base table creates a new group in the materialized view, a row must be inserted into the materialized view. Similarly if a DELETE operation is performed on a base table, the corresponding group in the materialized view must be updated. When all rows that contribute to a group are deleted from the base table, the row must be deleted from the materialized view. As previously described, an UPDATE performed on a base table can be treated as a combination of a DELETE of the old value followed by an INSERT of the new value, thus, UPDATES are treated as combinations of INSERTs and DELETEs.

Therefore, the application of the delta MV to the materialized view potentially consists of the following three phases.

INSERT_PHASE: This phase inserts new rows into the materialized view for any new groups generated by the INSERTs (or UPDATES) to the base tables.

UPDATE_PHASE: This phase updates the values of the aggregates to include the value of the aggregates in the delta MV, which includes UPDATES, INSERTS, and DELETES on the base tables. The actual update expression depends on the type of aggregate function.

DELETE_PHASE: This phase deletes groups from the materialized view if all rows from the base tables contributing to the group are deleted.

A MERGE table operation provides the functionality to insert rows into a table if they were not already present and update them if they were. The MERGE operation can be used to combine two phases above, i.e., the INSERT phase and the UPDATE phase. Use of the MERGE operation reduces the intermediate computations significantly. Hence, whenever both INSERT and UPDATE phases are encountered, they are replaced by a MERGE phase.

Ordering Base Tables for Application of Changes to the Materialized View

As indicated by Expression 3, to refresh the materialized view, the base tables can each be applied to the materialized view in different orders. The order of application of the base tables to the materialized view can significantly affect the performance of a refresh. For example, considering a materialized view on tables $T_1$ through $T_n$, if the changes to these tables are applied to the materialized view in the same order, for table $T_i$ the pre-update state would be computed (i−1) times (while applying changes on $T_1$ through $T_{i-1}$). Therefore, if computing the pre-update state of a table is computationally complex or expensive, the changes for that table should be applied to the materialized view before the changes from the other tables. The general degree of complexity of computing pre-update table states, in decreasing order, is:

tables on which conventional operations and direct load inserts have been performed;

tables on which a mix of conventional INSERTs and DELETEs, including UPDATES, have been performed (but no direct load INSERTS); and tables on which only INSERTs or only DELETEs have been performed.

Base tables with no changes are not considered when refreshing a materialized view. Furthermore, base tables on which other base tables contributing to the materialized view have foreign key constraints and have only INSERTs are also not considered for refresh because these INSERTs would be considered when the base tables which have foreign key constraints are considered for applying refresh. In one embodiment, the base tables are ordered based on the complexity of computing the pre-update state, according to the degree of complexity indicated above. In addition, it is faster to compute the pre-update state for a base table with a smaller cardinality. Thus, considering two base tables with similar complexity of operations, the larger table is considered first when applying refresh.

Hardware Overview

Figure 3:
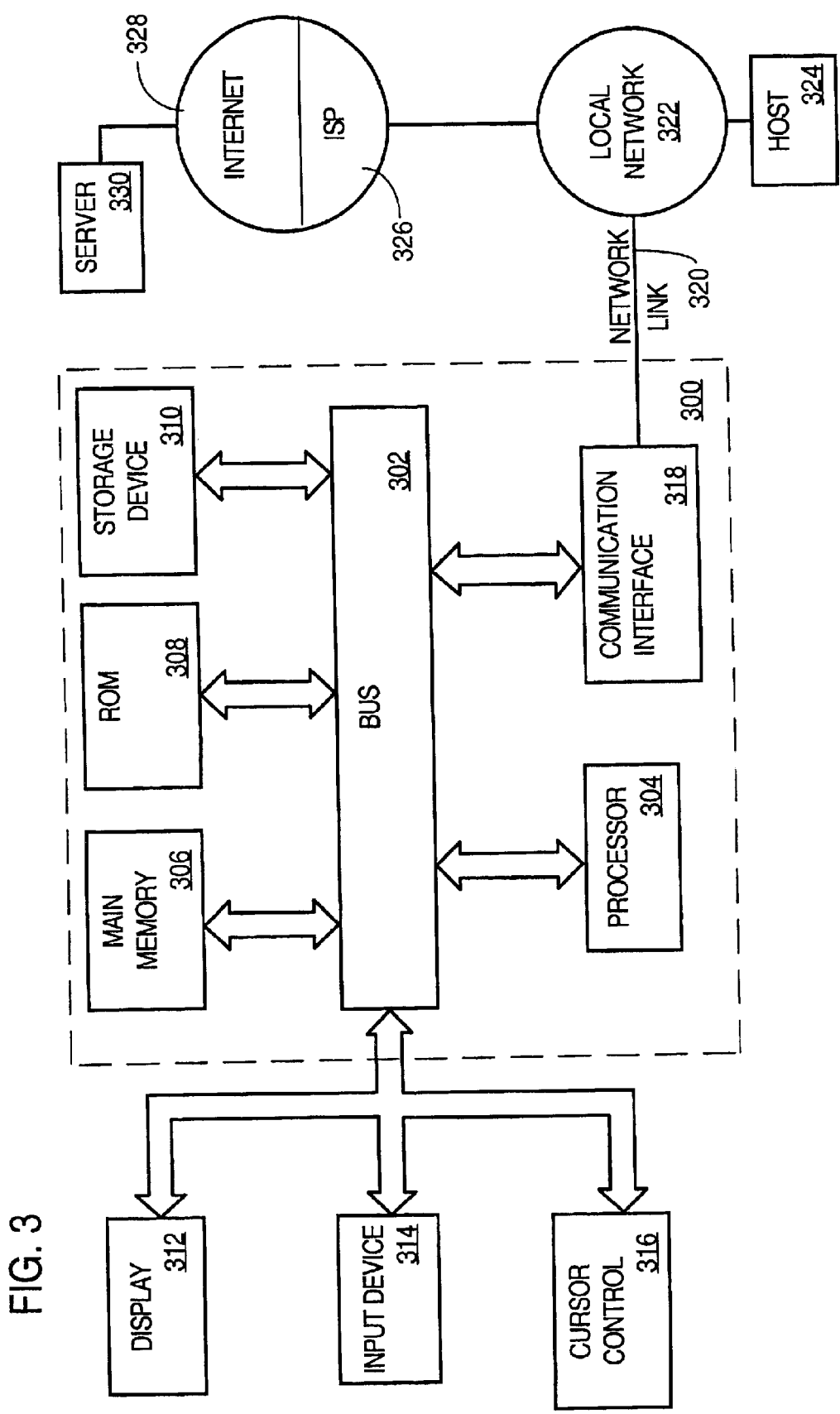
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 rU coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. As such, a computer such as computer system 300 might transmit a database query or executable code through Internet 328, ISP 326, local network 322 and communication interface 318.

The received query or code may be executed by processor 304 as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In addition, certain process steps are set forth in a particular order, and alphabetic an alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for refreshing a materialized view after a plurality of operations on a row of a base table of the materialized view, the method comprising the steps of:

determining an equivalent operation that has the same affect on the row that the plurality of operations have on the row; and refreshing the materialized view based on the equivalent operation.

2. The method of claim 1 wherein the step of determining an equivalent operation comprises:

identifying rows for which an earliest operation from the plurality of operations is a delete operation; and determining the equivalent operation on the rows based on the earliest operation.

3. The method of claim 1 wherein the step of determining an equivalent operation comprises:

identifying rows for which a latest operation from the plurality of operations is an insert operation; and determining the equivalent operation on the rows based on the latest operation.

4. The method of claim 1 wherein the step of determining an equivalent operation comprises:

identifying rows for which an earliest operation from the plurality of operations is a delete operation;

identifying rows for which a latest operation from the plurality of operations is an insert operation; and determining the equivalent operation on the rows based on the earliest operation and the latest operation.

5. The method of claim 1, wherein the step of refreshing the materialized view comprises:

performing an inverse operation of the equivalent operation to determine a pre-update state of the row; and refreshing the materialized view based on the pre-update state of the row.

6. The method of claim 1 wherein:

the materialized view is based on a plurality of base tables;

operations have been performed on multiple tables of the plurality of base tables;

the step of refreshing comprises the steps of
   determining a pre-update state of the row based on the equivalent operation; and
   refreshing the materialized view based on the pre-update state of the row.

7. The method of claim 6 wherein the step of refreshing the materialized view comprises refreshing a materialized view defined by a query that joins two or more of the plurality of base tables.

8. The method of claim 6 wherein the step of refreshing the materialized view comprises refreshing a materialized view that aggregates values from one or more of the plurality of base tables.

9. The method of claim 6 wherein the step of refreshing the materialized view comprises refreshing a materialized view that aggregates values from two or more of the plurality of base tables.

10. The method of claim 6 wherein the step of refreshing the materialized view comprises:
   ordering the multiple base tables according to the computational complexity of the step of determining the pre-update state of the row of each of the multiple base tables; and
   refreshing the materialized view based on the ordering, whereby a base table being more computationally complex is applied to the materialized view before a base table being less computationally complex.

11. The method of claim 10 wherein the step of refreshing the materialized view based on the ordering comprises:
   determining a number of rows that were operated on for each of the multiple base tables; and
   refreshing the materialized view based on the number of rows that were operated on, whereby a base table having more rows operated on is applied to the materialized view before a base table having fewer rows operated on, if the ordering indicates equal computational complexity of two or more of the multiple tables.

12. The method of claim 1 wherein the step of refreshing the materialized view comprises:
   determining a pre-update state of the row, including
      defining a delete query to identify rows for which an earliest operation from the plurality of operations is a delete operation;
      defining an insert query to identify rows for which a latest operation from the plurality of operations is an insert operation; and
      combining the delete query and the insert query into a delta query.

13. The method of claim 12 wherein the step of determining a pre-update state further comprises materializing results of the delta query into a temporary table.

14. The method of claim 13 wherein the step of materializing the delta query into a temporary table uses a WITH command.

15. The method of claim 1 wherein the plurality of operations are described in a materialized view log that describes each of the plurality of operations that were performed independently of other of the plurality of operations and a direct load log that describes an insert operation that was performed in bulk to a plurality of rows of the base table, and wherein the step of determining the equivalent operation comprises:
   creating a combined log by combining the materialized view log and the direct load log; and
   determining the equivalent operation based on the combined log.

16. The method of claim 15 wherein a plurality of operations are performed on a plurality of rows of the base table, the method further comprising:
   creating a first cardinality by determining from the materialized view log a number of rows of the base table that were inserted by independent operations;
   creating a second cardinality by determining from the direct load log a number of rows of the table that were inserted in bulk;
   creating a third cardinality by determining from the materialized view log a number of rows of the base table that were deleted by independent operations; and
   wherein the step of refreshing the materialized view is based on at least one of the first, second, and third cardinalities.

17. The method of claim 1 wherein the step of refreshing the materialized view comprises:
   expanding an original UNION ALL command such that at least one branch of a resulting UNION ALL command acts upon two or more tables that each have an index; and
   refreshing the materialized view, at least in part, based on the indexes.

18. The method of claim 1 wherein the step of refreshing the materialized view comprises:
   combining inserting a new row into the materialized view based on the equivalent operation and updating a row of the materialized view based on the equivalent operation as a single operation on the materialized view.

19. The method of claim 18 wherein the step of combining uses a MERGE command.

20. A computer-readable medium carrying one or more sequences of instructions for refreshing a materialized view after a plurality of operations on a row of a base table of the materialized view, wherein execution of the one or more sequences of instructions by one or more processors causes the one or more processors to perform the steps of:
   determining an equivalent operation that has the same affect on the row that the plurality of operations have on the row; and
   refreshing the materialized view based on the equivalent operation.

21. The computer-readable medium of claim 20 wherein execution of the one or more sequences of instructions by one or more processors causes the one or more processors to perform the step of determining an equivalent operation by causing the one or more processors to perform the steps of:
   identifying rows for which an earliest operation from the plurality of operations is a delete operation; and
   determining the equivalent operation based on the earliest operation.

22. The computer-readable medium of claim 20 wherein execution of the one or more sequences of instructions by one or more processors causes the one or more processors to perform the step of determining an equivalent operation by causing the one or more processors to perform the steps of:
   identifying rows for which a latest operation from the plurality of operations is an insert operation; and
   determining the equivalent operation based on the latest operation.

23. The computer-readable medium of claim 20 wherein execution of the one or more sequences of instructions by one or more processors causes the one or more processors to perform the step of determining an equivalent operation by causing the one or more processors to perform the steps of:
   identifying rows for which an earliest operation from the plurality of operations is a delete operation;

identifying rows for which a latest operation from the plurality of operations is an insert operation; and determining the equivalent operation based on the earliest operation and the latest operation.

24. The computer-readable medium of claim 20 wherein execution of the one or more sequences of instructions by one or more processors causes the one or more processors to perform the step of refreshing the materialized view by causing the one or more processors to perform the steps of:

performing an inverse operation of the equivalent operation to determine a pre-update state of the row; and refreshing the materialized view based on the pre-update state of the row.

25. The computer-readable medium of claim 20 wherein:

the materialized view is based on a plurality of base tables;

operations have been performed on multiple tables of the plurality of base tables;

execution of the one or more sequences of instructions by one or more processors causes the one or more processors to perform the step of refreshing the materialized view by causing the one or more processors to perform the steps of:

determining a pre-update state of the row based on the equivalent operation; and refreshing the materialized view based on the pre-update state of the row.

26. The computer-readable medium of claim 25 wherein execution of the one or more sequences of instructions by one or more processors causes the one or more processors to perform the step of refreshing the materialized view by causing the one or more processors to perform the steps of:

ordering the multiple base tables according to the computational complexity of the step of determining the pre-update state of the row of each of the multiple base tables; and refreshing the materialized view based on the ordering, whereby a base table being more computationally complex is applied to the materialized view before a base table being less computationally complex.

27. The computer-readable medium of claim 26 wherein execution of the one or more sequences of instructions by one or more processors causes the one or more processors to perform the step of refreshing the materialized view based on the ordering by causing the one or more processors to perform the steps of:

determining a number of rows that were operated on for each of the multiple base tables; and refreshing the materialized view based on the number of rows that were operated on, whereby a base table having more rows operated on is applied to the materialized view before a base table having fewer rows operated on, if the ordering indicates equal computational complexity of two or more of the multiple tables.

28. The computer-readable medium of claim 20 wherein execution of the one or more sequences of instructions by one or more processors causes the one or more processors to perform the step of refreshing the materialized view by causing the one or more processors to perform the steps of:

determining a pre-update state of the row, including defining a delete query to identify rows for which an earliest operation from the plurality of operations is a delete operation;

defining an insert query to identify rows for which a latest operation from a plurality of operations is an insert operation; and combining the delete query and the insert query into a delta query.

29. The computer-readable medium of claim 28 wherein execution of the one or more sequences of instructions by one or more processors causes the one or more processors to perform the step of determining a pre-update state by causing the one or more processors to perform the steps of:

materializing results of the delta query into a temporary table.

30. The computer-readable medium of claim 20 wherein the plurality of operations are described in a materialized view log that describes each of the plurality of operations that were performed independently of other of the plurality of operations and a direct load log that describes an insert operation that was performed in bulk to a plurality of rows of the base table, and wherein execution of the one or more sequences of instructions by one or more processors causes the one or more processors to perform the step of determining the equivalent operation by causing the one or more processors to perform the steps of:

creating a combined log by combining the materialized view log and the direct load log; and determining the equivalent operation based on the combined log.

31. The computer-readable medium of claim 30 wherein a plurality of operations are performed on a plurality of rows of the base table, and wherein execution of the one or more sequences of instructions by one or more processors causes the one or more processors to perform the steps of:

creating a first cardinality by determining from the materialized view log a number of rows of the base table that were inserted by independent operations;

creating a second cardinality by determining from the direct load log a number of rows of the table that were inserted in bulk;

creating a third cardinality by determining from the materialized view log a number of rows of the base table that were deleted by independent operations; and wherein the step of refreshing the materialized view is based on at least one of the first, second, and third cardinalities.

32. The computer-readable medium of claim 20 wherein execution of the one or more sequences of instructions by one or more processors causes the one or more processors to perform the step of refreshing the materialized view by causing the one or more processors to perform the step of:

combining inserting a new row into the materialized view based on the equivalent operation and updating a row of the materialized view based on the equivalent operation as a single operation on the materialized view.

33. A computer apparatus comprising:

a memory; and one or more processors coupled to the memory and configured to execute one or more sequence of instructions for refreshing a materialized view after a plurality of operations on a row of a base table of the materialized view, wherein execution of the one or more sequences of instructions by one or more processors causes the one or more processors to perform the steps of:

determining an equivalent operation that has the same affect on the row that the plurality of operations have on the row; and refreshing the materialized view based on the equivalent operation.

* * * * *